US009533900B2

(12) United States Patent
Stark (10) Patent No.: US 9,533,900 B2
(45) Date of Patent: Jan. 3, 2017

(54) AERATOR/DIGESTER FOR WATER TREATMENT

(71) Applicant: WELLS TUDOR, LLC, Buffalo, NY (US)

(72) Inventor: John G. Stark, Williamsville, NY (US)

(73) Assignee: Wells Tudor, LLC, Buffalo, NY (US)

( * ) Notice: Subject to any disclaimer, the term of this patent is extended or adjusted under 35 U.S.C. 154(b) by 247 days.

(21) Appl. No.: 14/528,302

(22) Filed: Oct. 30, 2014

(65) Prior Publication Data

US 2016/0122216 A1    May 5, 2016

(51) Int. Cl.
| | | |
|---|---|---|
| C02F 3/20 | (2006.01) | |
| C02F 3/22 | (2006.01) | |
| C02F 101/32 | (2006.01) | |
| C02F 103/00 | (2006.01) | |

(52) U.S. Cl.
CPC . *C02F 3/20* (2013.01); *C02F 3/22* (2013.01); *C02F 3/201* (2013.01); *C02F 2101/32* (2013.01); *C02F 2103/007* (2013.01); *C02F 2203/006* (2013.01); *Y02W 10/15* (2015.05)

(58) Field of Classification Search
CPC .................. B01F 2003/04276; B01F 3/04517; C02F 3/20; C02F 3/22; C02F 2203/006; C02F 3/201; C02F 2103/007; C02F 2101/32; Y02W 10/15
See application file for complete search history.

(56) References Cited

U.S. PATENT DOCUMENTS

| | | | | |
|---|---|---|---|---|
| 4,183,787 A | * | 1/1980 | Roesler | B01D 19/0042 261/36.1 |
| 4,569,757 A | * | 2/1986 | Moore | B01F 3/04517 210/220 |
| 5,376,311 A | * | 12/1994 | DeGuzman | B01F 3/04262 261/122.1 |
| 5,637,231 A | * | 6/1997 | Hill | A61L 2/202 210/205 |
| 6,017,020 A | * | 1/2000 | Baughman | B01F 3/04106 261/122.1 |

(Continued)

FOREIGN PATENT DOCUMENTS

NO    FR 2245828 A1 *    4/1975 ............. A47K 11/02

*Primary Examiner* — Amber R Orlando
*Assistant Examiner* — Stephen Hobson
(74) *Attorney, Agent, or Firm* — Nikolai & Mersereau, P.A.; Thomas J. Nikolai (57) ABSTRACT

An Aerator/Digester for treating wastewater comprises cylindrical chamber having a centrally disposed air pipe supported from the chambers closed bottom end and extending along a longitudinal axis of the cylindrical chamber and beyond the upper end. The air pipe includes at least one aperture pattern comprising plural interleaved rows of relatively small diameter holes and larger diameter holes. When air under pressure, is introduced through the air pipe, a Venturi effect is created to draw wastewater into the chamber via ports formed near the closed bottom end and out via one or more outlet ports proximate to the upper end. The apertures are drilled through the air pipe at an angle to the vertical with the small diameter apertures inclined at an upward angle and the larger diameter apertures at a downward angle which has been found to enhance the circulation of the wastewater.

13 Claims, 6 Drawing Sheets

(56) References Cited

U.S. PATENT DOCUMENTS

| | | | | |
|---|---|---|---|---|
| 6,032,931 | A * | 3/2000 | Plunkett | B01F 3/04517 210/220 |
| 6,290,855 | B1 * | 9/2001 | Savegnago | B01F 3/04517 210/170.06 |
| 6,386,751 | B1 * | 5/2002 | Wootan | B01F 3/0807 366/150.1 |
| 7,708,259 | B2 * | 5/2010 | James | B01F 3/0412 261/122.1 |
| 7,874,548 | B1 * | 1/2011 | McGuffin | B01F 3/04517 210/242.2 |
| 7,963,508 | B1 * | 6/2011 | McGuffin | B01F 3/04517 210/221.2 |
| 8,016,273 | B1 * | 9/2011 | Dartez | B01F 3/04113 261/120 |
| 9,193,614 | B2 * | 11/2015 | McGuffin | C02F 1/78 |
| 2001/0007313 | A1 * | 7/2001 | Suzuki | B01F 7/26 210/749 |
| 2002/0011441 | A1 * | 1/2002 | Drie | B01F 3/04113 210/513 |
| 2006/0270036 | A1 * | 11/2006 | Goodwin | B01F 3/04269 435/395 |
| 2008/0017574 | A1 * | 1/2008 | Lenger | C02F 3/101 210/610 |
| 2011/0101548 | A1 * | 5/2011 | Kim | B01F 3/04248 261/124 |
| 2011/0304063 | A1 * | 12/2011 | Ko | B01F 3/04262 261/77 |
| 2013/0082410 | A1 * | 4/2013 | Goodwin | B01F 15/0085 261/42 |

\* cited by examiner

AERATOR/DIGESTER FOR WATER TREATMENT

STATEMENT REGARDING FEDERALLY SPONSORED RESEARCH OR DEVELOPMENT

Not applicable

BACKGROUND OF THE INVENTION

I. Field of the Invention

This invention relates generally to apparatus for treating waste water, aerating ponds, and for eliminating the buildup of fats, oils, greases found in pump lift stations, wet wells and grease interceptors encountered in water treatment facilities, and more particularly to a compact device for increasing the oxygen content of water and for simultaneously pulverizing organic solids that may be present in the water being treated.

II. Discussion of the Prior Art

In the McGuffin U.S. Pat. No. 7,963,508 there is described an apparatus for aerating liquids and for enhancing digestion of solid organic materials present therein by microbial action. The device serves to pulverize organic solids into micron sizes, allowing bacteria to more readily process the material. The apparatus comprises and elongate tubular housing have a solid, preferably heavy, base to anchor the housing in a vertical disposition within a pond or vessel in which the water to be treated is contained. The housing has three inlet ports spaced 120 degrees apart near the base and an open top. Positioned over the open top is a circular manifold comprising a plurality of concentric ridges. An air feed conduit is centrally disposed within the housing and extends from the base upward through the manifold where it is adapted to be connected to a source of pressurized air. The air feed conduit includes a plurality of apertures through a wall thereof at a location offset from the bottom end thereof, just above the three inlet ports. To stabilize the air feed conduit, three walls or partitions extend between the air feed conduit and the interior wall of the tubular housing, effectively dividing the housing into three chambers, each encompassing one of the three inlet ports.

When air, under pressure, is applied to the upper end of the air feed conduit, bubbles are created in the water in which the device is submerged and the rising bubbles create a Venturi effect to draw water into the housing through the inlet ports. The air increases the oxygen content of the water and as the flow exits the open top of the housing, it is made to impinge on the stepped concentric edges on the manifold to break up organic solids present in the waste water.

As is explained in detail below, the present invention is similar in many respects to the McGuffin device described above, but various non-obvious and novel modifications have been incorporated into the preferred embodiment of the present invention to improve the efficiency, reduce the cost, prolong the useful life and lower the maintenance cost when compared to the McGuffin apparatus.

SUMMARY OF THE INVENTION

The present invention has a tubular housing defining a cylindrical chamber with a closed and weighted bottom end and an open upper end. Water inlet ports are located near the base and water exits the open top. A stack of concentric equilateral triangles of diminishing side length is disposed proximate the upper end of the housing. Passing vertically downward through a central hole in the stack is an airflow tube whose lower end is threaded into a tapped bore at the center of the base that closes off the bottom end of the tubular housing. As such, the rigid airflow tube is supported upright of the base. This obviates the need for the partitions employed in the McGuffin apparatus that it needs to stabilize and support the air feed conduit.

In the present invention, the air exit ports drilled in the air flow tube are in a pattern of alternating rows of small diameter holes and larger diameter holes. Device application dictates the drill angle of the holes. The smaller series of holes are drilled at a range of 10 degrees to a maximum upward angle of about 30 degrees to the longitudinal axis of the housing and the larger holes are drilled at a range of 0 degrees to a maximum downward angle of about 60 degrees. In this manner, larger size bubbles are directed downward before rising. This has been found to enhance the Venturi draw of water through the housings bottom inlet ports while the smaller holes in the air tube result in smaller size bubbles for improving aeration of the water as they rise to exit the barrel housings water outlet ports. Because of the size difference in the bubbles, there is less combining of the two. The flow stream is also directed against and impinges on the edges of the stacked triangles before exiting the housing. This serves to continuously pulverize material that repeatedly recirculates through by re-entering the chamber through the lower water inlet ports.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

The description of the preferred embodiment is intended to be read in conjunction with the accompanying drawings which are to be considered part of the entire written description of this invention. In the description, relative terms such as "lower", "upper", "horizontal", "vertical", "above", "below", "up", "down", "top", and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join", and "joining" are used interchangeable and referred to one structure or surface being secured to another structure or surface or integrally fabricated in one piece, unless expressly described otherwise.

Figure 1:
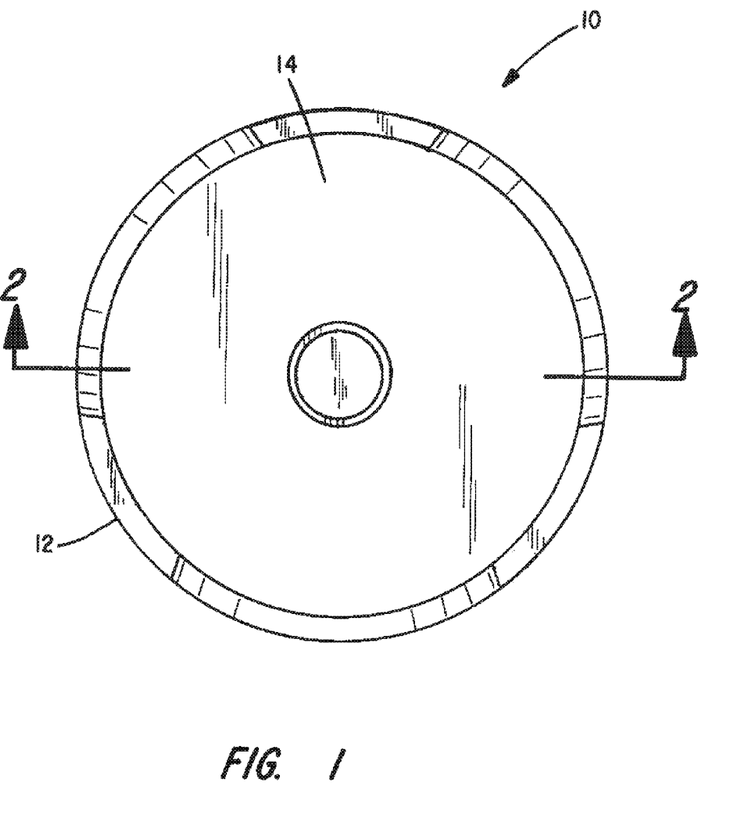
FIG. 1 is a top plan view of the aerator/digester comprising a preferred embodiment of the present invention.
Figure 2:
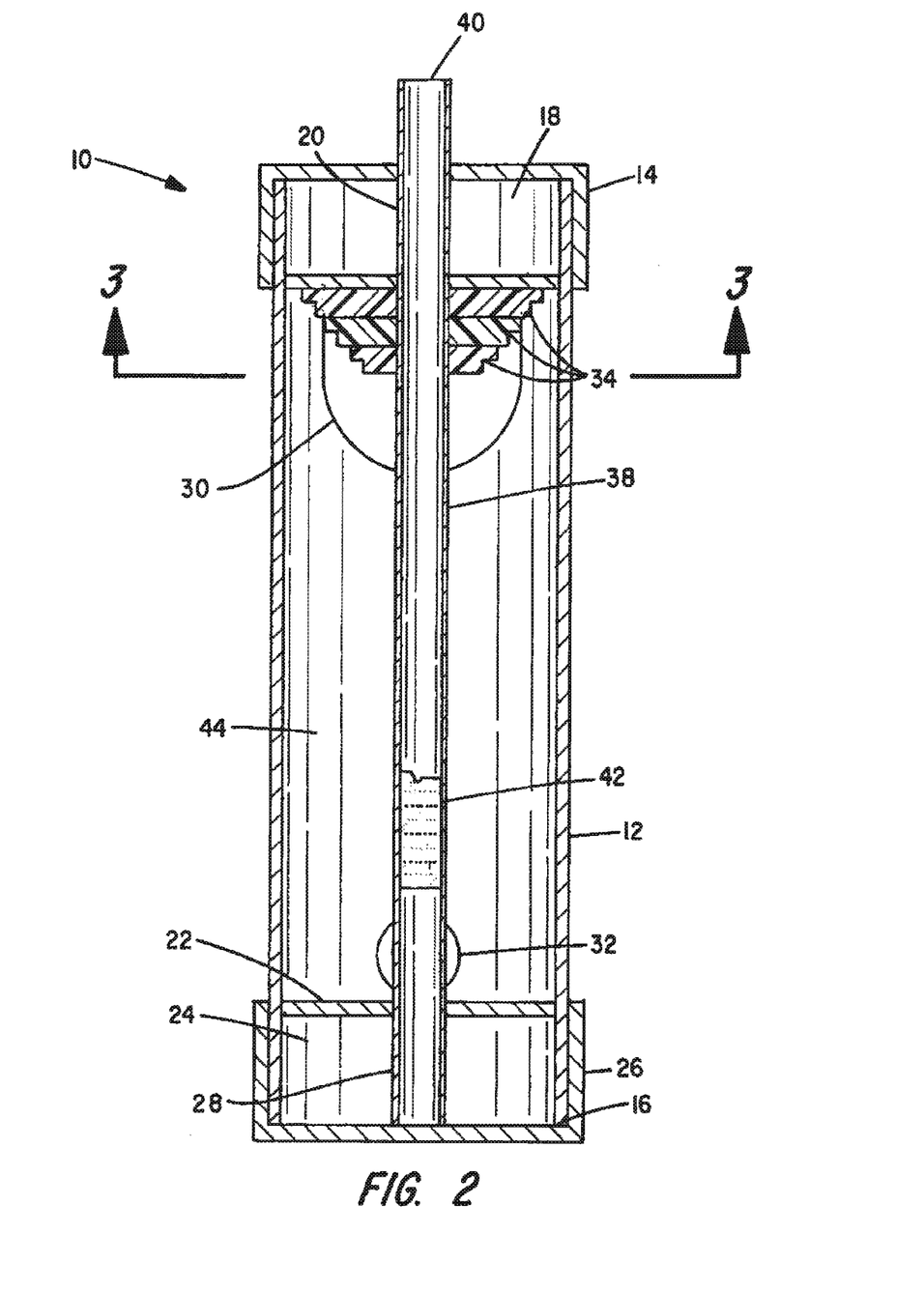
FIG. 2 is a front cross-sectional view taken along the line 2-2 in FIG. 1.

Referring to FIGS. 1 and 2, a first embodiment of the Aerator/Digester is indicated generally by numeral 10 and is seen to comprise a tubular housing 12 in the form of a right circular cylinder with an upper end 14 and a lower end 16. Without limitation, the housing may have a diameter of about 10¾ inches, a height dimension of 34 inches, and a wall thickness of about inches. It may comprise a non-corrosive material such as polyvinylchloride (PVC) or stainless steel.

Fitted into the upper end 14 of the tubular housing 12 is a plug 18 having an aperture 20 formed through its thickness dimension and located at the center thereof. Located approximately 4 inches above the lower end 16 of the housing 12 is an internal seal plate 22 beneath which is a ballast member 24. The ballast member may be concrete or other heavy material such as stainless steel with concrete being preferred due to its low cost. An external bottom cap 26 fits over the bottom end of the housing to serve as a base.

The seal plate 22 and the ballast member 24 have a centrally disposed vertical bore 28 which may be threaded or unthreaded.

Located just below the top plug 18 are three inverted U-shaped openings, equally spaced about the perimeter of the housing, only one of which is visible in FIG. 2 and is identified by numeral 30. Again, without limitation, the sides of the U-shaped openings 30 may be 7 inches apart and the circular arch joining the two sides may have a radius of 3 inches. The three U-shaped apertures function as discharge openings as will be further explained below.

Located just above the seal plate 22 proximate the bottom end of the housing 12 are three equally spaced apart circular apertures in the housing wall, only one of which is visible in FIG. 2 and is identified by numeral 32. The apertures 32 function as waste stream entrance ports.

Figure 3:
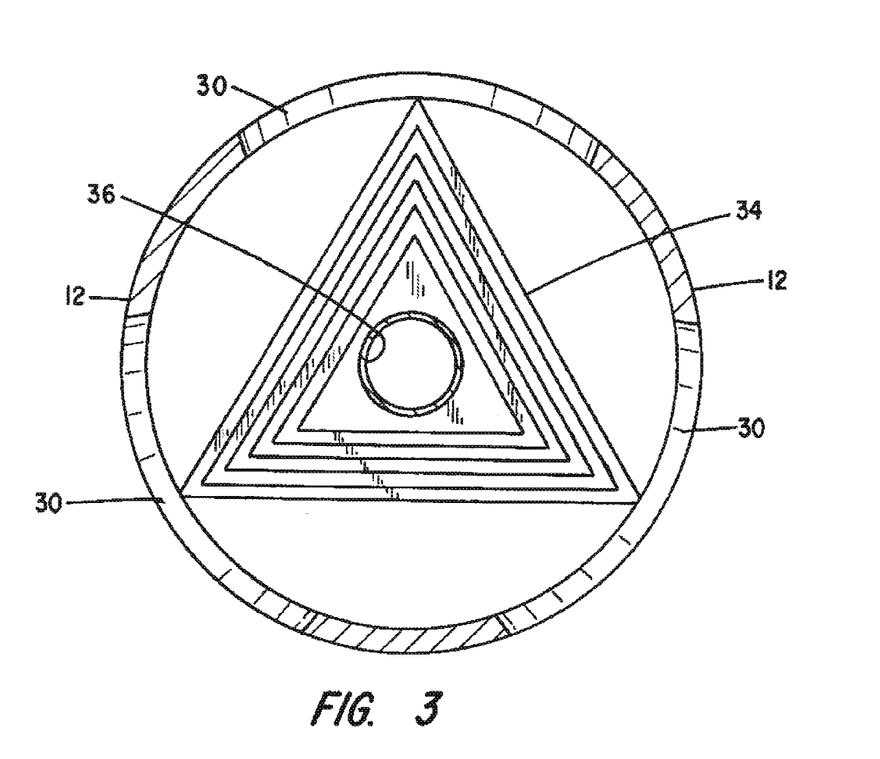
FIG. 3 is a cross sectional view taken along the line 3-3 in FIG. 2.
Figure 4:
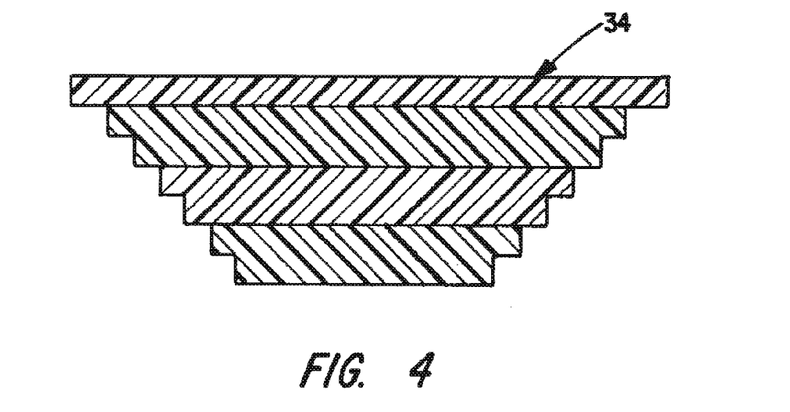
FIG. 4 is an enlarged side view of the stationary triangular impingement member seen in FIG. 2.

Referring next to FIGS. 3 and 4, it will be seen that affixed to the underside of the top plug 18 is a stationary, triangular impingement member 34. It comprises a stack of blocks, each forming an equilateral triangle where the blocks are of successively decreasing edge size in progressing from upper to lower when viewed in the side elevation of FIG. 4. A circular bore 36 is formed through the thickness of the stack at a center thereof. The members of the stack are preferably composed, but not limited to, a glass-filled polyvinyl chloride polymer material which exhibits a high resistance to abrasion. The three triangular blocks are further processed in a routing operation to add an additional shear surface to each block in the stack.

Extending through the cap 14, the bore 20 and the plug 18, the bore 36 in the impingement member and into the boar 28 in the ballast member 24 is an air tube 38 whose upper most end 40 is adapted to be connected to a source of air, such as a regenerative blower (not shown). The O.D. of the air tube 38 may provide an interference fit with the bores 20 and 28 to thereby firmly hold the air tube 38 without the need for partition walls as in the McGuffin device. When the ballast member is stainless steel and the bore 28 is threaded, the bottom end of the air tube 38 may also be threaded to screw into the ballast member. The air tube 38 includes a plurality of aperture patterns drilled through the wall thereof, one such pattern indicated generally in FIG. 2 by numeral 42. It is located close to, but above, the level of the waste stream entrance ports 32 formed in the wall of housing 12. Preferably, three such patterns are formed around the circumference of the air tube each being aligned above one of the wastewater entrance ports 32.

Figure 5:
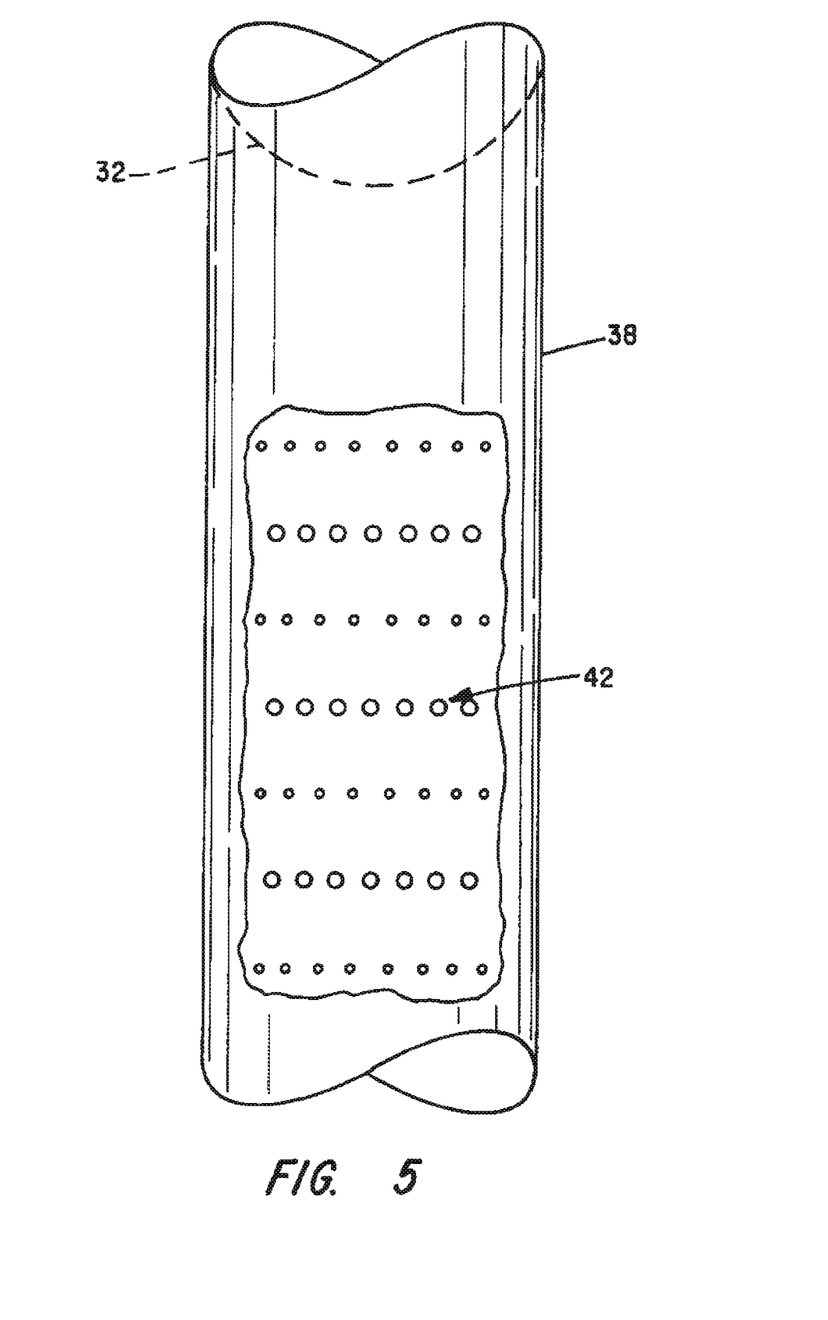
FIG. 5 is an enlarged partial view of the air tube shown in FIG. 2 illustrating a preferred air discharge hole pattern formed in the air tube.
Figure 6:
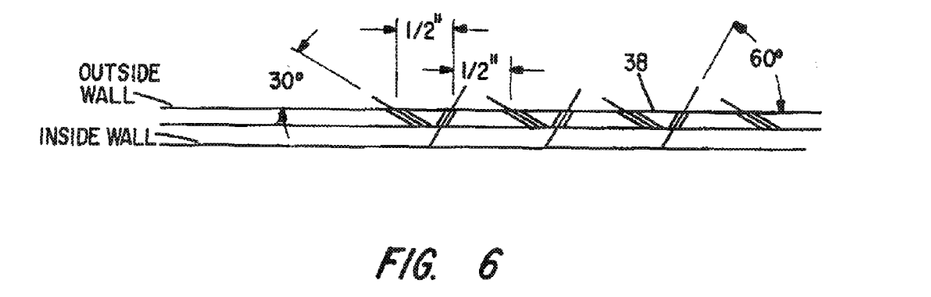
FIG. 6 is a segment of the wall of the air tube showing the angles at which the holes are drilled therein.

As seen in FIG. 5, each of the hole patterns 40 form a matrix where rows of relatively large apertures are interleaved with rows of relatively smaller apertures and where the columns of larger apertures are interleaved between columns of smaller apertures. It has been found efficacious to make the small apertures 3/64 inch in diameter and the larger apertures 5/64 inch in diameter. Further, as shown in FIG. 6, the apertures in the matrix can be drilled normal to the longitudinal axis of the air tube 38, but instead the larger apertures are drilled so as to be downwardly inclined at an angle of 60 degree to the horizontal as viewed in FIG. 6 while the smaller apertures are drilled inward at an angle of about 150 degrees. The angles may be varied depending upon application In use, the Aerator/Digester 10 is placed in a pond or other flooded holding basin such that the weighted bottom of the device 10 rests on a horizontal surface. The upper end 40 of the air tube 38 is then connected to a source of pressurized air, preferably in a range from 1.0 psi to 2.5 psi. The air flows down the air tube 38 and exits the apertures in the pattern of apertures 42. It is found that air exiting the smaller apertures creates countless smaller diameter bubbles while the air exiting the larger diameter apertures form relatively larger bubbles. Because of the angle at which the apertures in the matrices 40 are drilled, the smaller bubbles float upward such that the profusion thereof mix with the wastewater to aerate same while the larger diameter bubbles are initially directed downward toward the inlet ports 32 before they reverse direction and flow upward in the chamber 44 defined by the interior of the housing 12. The movement of the larger bubbles proximate the inlet ports 32 and upward therefrom at a high velocity creates a Venturi effect to circulate the wastewater into the chamber 44 through the wastewater entrance ports 32. As the bubbles rise in the chamber 44, organic particulate matter that may be present in the wastewater are driven at a high velocity against the impingement member 34 whose sharp corner edges function to pulverize the clumps before exiting the U-shape discharge openings 30. By increasing the oxygen content of the wastewater and by pulverizing organic matter, aerobic bacteria in the water are better able to thrive and process the increasingly smaller organic substances, thereby improving the quality of the water in which the device 10 is used. As the device runs continuously, wastewater recirculates through the Aerator/Digester 10 with each pass further purifying the wastewater. It has been experimentally determined that the smaller bubbles are not inclined to merge with the larger bubbles and hence improve the efficiency of aeration and promote bacterial digestion of particulates in the waste stream.

Figure 7:
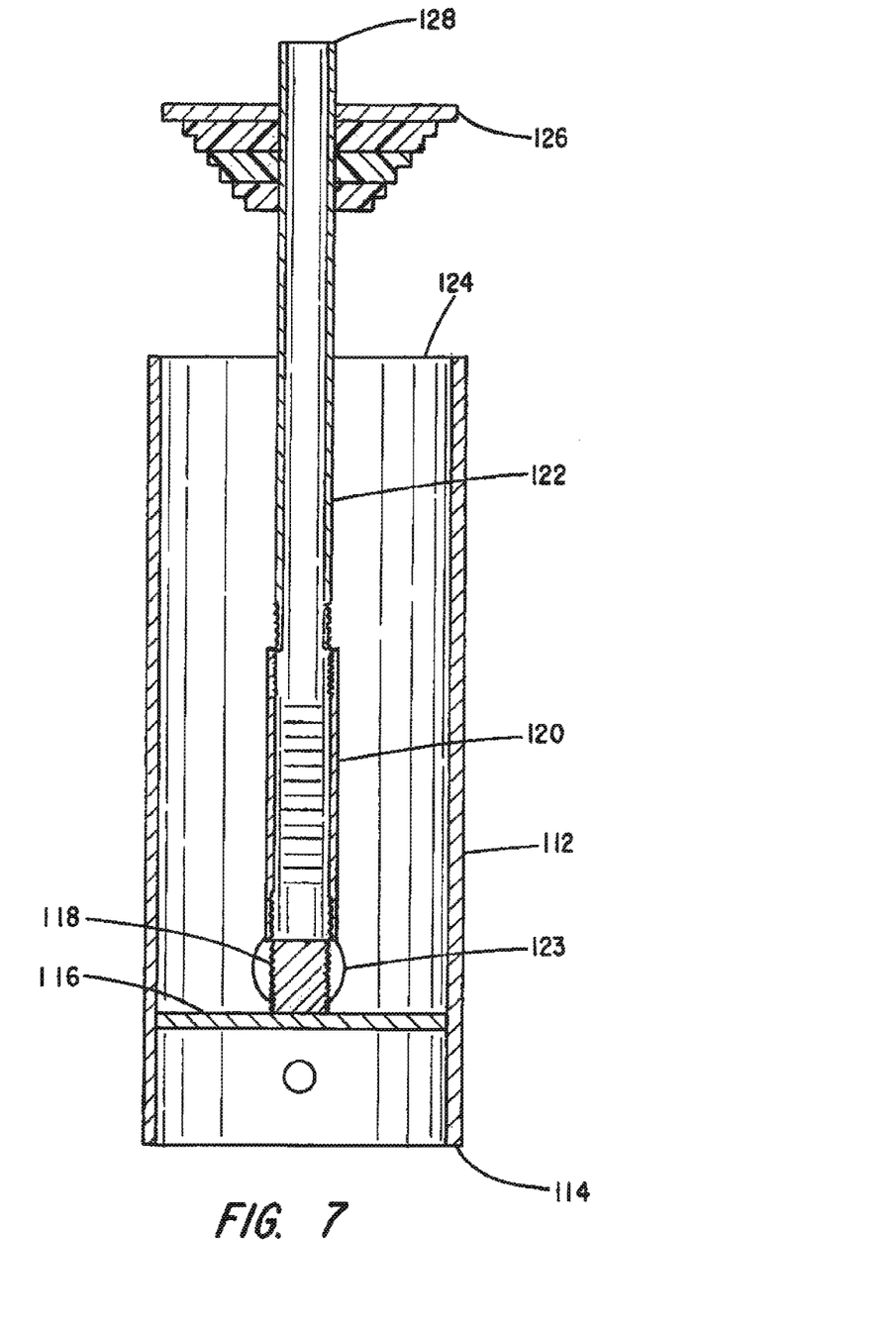
FIG. 7 is a vertical, cross-sectional view of a further embodiment of the invention.

Turning next to FIG. 7, there is shown a longitudinal cross-section of an alternate embodiment of the invention. Like the embodiment of FIG. 2, it comprises an outer tubular housing 112, preferably a right circular cylinder approximately 10 to 12 inches in diameter and about 14 to 26 inches in length. Fabricating the housing 112 from PVC pipe provides a low cost construction.

Located approximately 4 inches up from the lower end 114 is a stainless steel ballast slab 116 that is press fit into the ID of the tubular housing 112. Centrally located in the ballast slab 116 is a threaded bore and threaded into the bore is an externally threaded connector 118 to which an air distribution manifold member 120 is also attached.

The air distribution manifold 120 preferably comprises a stainless steel tube about 10 inches in length, 2 inches in diameter and internally threaded at both ends so as to be attachable to the externally threaded connector 118 at its lower end and to an air pipe 122 at its upper end. Attached to the air pipe 122 above the open upper end 124 of the housing 112 is an impingement member 126. As in the previous embodiment, the impingement member comprising a stack of triangular blocks of diminishing side length made from, but not limited to, a fiberglass impregnated plastic. The impingement member 126 is positioned so that any inorganic materials or large organic material exiting the open top 124 will strike it and further pulverize organic materials so that upon repeated recirculation through the aerator/digester of FIG. 7 will be better digested by bacteria present in the wastewater being aerated.

As in the first embodiment described, a source of compressed air, such as a blower (not shown) is suitably attached by conduit to the upper end 128 of the air pipe 122 which causes streams of bubbles of various sizes exiting the air distribution manifold 120 to rise rapidly up the length of the housing creating by the Venturi effect, a circulation of the wastewater through the inlet ports 123, up the length of the housing 112, out its open top 124 and impinging on the exposed edges of the impingement member 126. While larger diameter bubbles tend to promote circulation, the thousands of smaller size bubbles serve to supply oxygen to the microorganisms responsible for the digestion of organic particulate in the waste stream.

Because many varying and different embodiments may be made within the scope of the inventive concept herein taught and because many modifications may be made in the embodiment, herein detailed in accordance with the descriptive requirements of the law, it is to be understood that the details herein are to be interpreted as illustrative and not in a limiting sense.

I claim:

1. An aerator/digester apparatus comprising:
   (a) a tubular housing defining a chamber having a bottom end and a top end, said tubular housing having at least one wastewater inlet proximate the bottom end and at least one outlet proximate the top end;
   (b) a longitudinally extending air pipe centrally disposed in the chamber, the longitudinally extending air pipe including an air manifold having a pattern of apertures, the pattern including a matrix of rows of relatively small diameter apertures and rows of relatively larger diameter apertures, with columns of small diameter apertures laterally offset with respect to columns of larger diameter apertures and where the small diameter apertures are formed at an upwardly inclined angle and the larger diameter apertures are formed at a downwardly inclined angle to the longitudinal access of the air pipe, said pattern being disposed at an elevation immediately superior to the at least one wastewater inlet; and
   (c) an impingement surface affixed to the longitudinally extending air pipe proximate the top end.

2. The aerator/digester apparatus of claim 1 wherein the impingement surface comprises a plurality of equilateral triangular blocks of differing side length stacked one below another.

3. The aerator/digester apparatus of claim 2 wherein each block exhibits six impingement edges.

4. The aerator/digester apparatus of claim 1 wherein the top end is closed and the at least one outlet has an inverted U-shape and is adjacent the impingement surface.

5. The aerator/digester apparatus as in claim 1 wherein the bottom is closed by a ballast element tending to maintain the tubular housing upright when subjected to a sidewise directed force.

6. The aerator/digester apparatus of claim 5 wherein the ballast element comprised one of a stainless steel and a brass plate having a centrally located bore for receiving an end of a fitting on a bottom end of the longitudinally extending air pipe.

7. The aerator/digester apparatus of claim 1 wherein the longitudinally extending air pipe is adapted to be connected to a source of pressurized air and when so connected, smaller size bubbles issue from the smaller diameter apertures and larger size bubbles issue from the larger diameter apertures, the bubbles rising in the wastewater creating a flow of wastewater through the at least one wastewater inlet, up through the chamber and out from the at least one outlet while aerating the wastewater.

8. The aerator/digester as in claim 1 wherein solids present in the flowing wastewater are made to impinge on the impingement surface and are pulverized thereby.

9. The aerator/digester of claim 1 wherein the tubular housing comprises a right circular cylinder formed of a non-corrosive material.

10. The aerator/digester of claim 9 wherein the non-corrosive material is one of PVC and stainless steel.

11. The aerator/digester apparatus as in claim 1 wherein the air manifold is removably connected to the longitudinally extending air pipe and to a ballast plate displaced below the at least one wastewater inlet.

12. The aerator/digester apparatus as in claim 11 wherein the air manifold is removably connected to the longitudinally extending air pipe and to the ballast plate by threaded connections to each.

13. The aerator/digester apparatus as in claim 12 wherein the longitudinally extending air pipe and air manifold are stainless steel and the tubular housing is a PVC tube.

* * * * *